United States Patent
Delingat et al.

(10) Patent No.: US 10,133,772 B2
(45) Date of Patent: Nov. 20, 2018

(54) MULTI-DIMENSIONAL QUERY STATEMENT MODIFICATION

(71) Applicant: eBay Inc., San Jose, CA (US)

(72) Inventors: Marc Delingat, Mountain View, CA (US); Snezana Sahter, San Jose, CA (US); Liangjie Xu, Saratoga, CA (US)

(73) Assignee: eBay Inc., San Jose, CA (US)

( * ) Notice: Subject to any disclaimer, the term of this patent is extended or adjusted under 35 U.S.C. 154(b) by 346 days.

(21) Appl. No.: 15/091,357

(22) Filed: Apr. 5, 2016

(65) Prior Publication Data

US 2016/0217178 A1 Jul. 28, 2016

Related U.S. Application Data

(63) Continuation of application No. 11/780,985, filed on Jul. 20, 2007.

(51) Int. Cl.
*G06Q 10/00* (2012.01)
*G06F 17/30* (2006.01)
*G06Q 30/04* (2012.01)
*G06Q 50/18* (2012.01)

(52) U.S. Cl.
CPC .. *G06F 17/30395* (2013.01); *G06F 17/30389* (2013.01); *G06F 17/30477* (2013.01); *G06F 17/30528* (2013.01); *G06Q 30/04* (2013.01); *G06Q 50/184* (2013.01)

(58) Field of Classification Search
CPC combination set(s) only.
See application file for complete search history.

(56) References Cited

U.S. PATENT DOCUMENTS

| | | | |
|---|---|---|---|
| 6,269,369 B1* | 7/2001 | Robertson | G06Q 10/02 |
| 6,397,212 B1* | 5/2002 | Biffar | G06F 17/30864 |
| | | | 705/7.29 |
| 6,405,192 B1* | 6/2002 | Brown | G06F 17/30873 |
| | | | 707/722 |

(Continued)

OTHER PUBLICATIONS

"U.S. Appl. No. 11/780,985 , Appeal Brief filed Mar. 19, 2012", 26 pgs.

(Continued)

*Primary Examiner* — Gabrielle A McCormick
(74) *Attorney, Agent, or Firm* — Wolfe-SBMC (57) ABSTRACT

Systems and methods for multi-dimensional query statement modification are described. A system presents a user interface including a first plurality of graphical elements representing a plurality of activity dimensions to a user. The system detects a user selection of a first activity dimension and a second user selection of a first attribute of the first activity dimension without a selection of the second attribute. The system searches objects using a search query based on the first activity dimension and the first attribute to return search results including a first object published on a network-based publication system by a client. The system provides a notification message to the user responsive to identifying feedback information that is received from a trading partner of the client as transgressing a first threshold. The feedback information is identified based on the first object and the second attribute that is not selected from the user interface.

20 Claims, 10 Drawing Sheets

(56) References Cited

U.S. PATENT DOCUMENTS

| | | | | |
|---|---|---|---|---|
| 7,065,494 | B1* | 6/2006 | Evans | G06Q 10/06393 370/248 |
| 7,080,064 | B2* | 7/2006 | Sundaresan | G06F 17/30864 |
| 2001/0032170 | A1* | 10/2001 | Sheth | G06Q 10/0631 705/37 |
| 2001/0034672 | A1* | 10/2001 | McCoy | G06Q 10/06 705/28 |
| 2002/0095362 | A1* | 7/2002 | Masand | G06Q 40/00 705/35 |
| 2003/0018585 | A1* | 1/2003 | Butler | G06Q 30/02 705/53 |
| 2003/0055723 | A1* | 3/2003 | English | G06Q 30/02 705/14.51 |
| 2003/0055743 | A1* | 3/2003 | Murcko, Jr. | G06Q 30/06 705/26.2 |
| 2003/0144922 | A1* | 7/2003 | Schrantz | G06Q 30/06 705/26.1 |
| 2004/0049448 | A1* | 3/2004 | Glickman | G06Q 40/04 705/37 |
| 2004/0122926 | A1* | 6/2004 | Moore | G06F 17/30864 709/223 |
| 2004/0128155 | A1* | 7/2004 | Vaidyanathan | G06Q 10/10 705/309 |
| 2004/0169678 | A1* | 9/2004 | Oliver | G06Q 30/02 715/738 |
| 2005/0052998 | A1* | 3/2005 | Oliver | H04L 41/0659 370/231 |
| 2005/0192958 | A1* | 9/2005 | Widjojo | G06Q 10/02 |
| 2005/0240525 | A1* | 10/2005 | Bagayatkar | G06Q 20/102 705/40 |
| 2005/0246187 | A1* | 11/2005 | Maltzman | G06Q 10/06395 705/7.41 |
| 2005/0261919 | A1* | 11/2005 | Kundtz | G06Q 30/02 705/14.4 |
| 2005/0267887 | A1* | 12/2005 | Robins | G06Q 10/06 |
| 2006/0095586 | A1* | 5/2006 | Adelman | G06Q 10/107 709/245 |
| 2006/0149745 | A1* | 7/2006 | Mengerink | G06Q 20/10 |
| 2007/0043651 | A1* | 2/2007 | Xiao | G06Q 30/08 705/37 |
| 2007/0078675 | A1* | 4/2007 | Kaplan | G06Q 10/10 705/26.1 |
| 2007/0112729 | A1* | 5/2007 | Wiseman | G06F 17/3087 |
| 2008/0147575 | A1* | 6/2008 | Roy | G06F 17/30705 706/12 |
| 2009/0024402 | A1 | 1/2009 | Delingat et al. | |

OTHER PUBLICATIONS

"U.S. Appl. No. 11/780,985 , Response filed Sep. 19, 2011 to Non Final Office Action dated Jun. 20, 2011", 14 pgs.

"U.S. Appl. No. 11/780,985, Advisory Action dated Jan. 4, 2012", 3 pgs.

"U.S. Appl. No. 11/780,985, Appeal Decision dated Apr. 9, 2015", 5 pgs.

"U.S. Appl. No. 11/780,985, Decision on Pre-Appeal Brief dated Feb. 10, 2012", 2 pgs.

"U.S. Appl. No. 11/780,985, Examiner Interview Summary dated Feb. 9, 2016", 3 pgs.

"U.S. Appl. No. 11/780,985, Examiner's Answer to Appeal Brief dated May 10, 2012", 10 pgs.

"U.S. Appl. No. 11/780,985, Final Office Action dated Mar. 28, 2011", 8 pgs.

"U.S. Appl. No. 11/780,985, Final Office Action dated Jul. 22, 2010", 7 pgs.

"U.S. Appl. No. 11/780,985, Final Office Action dated Oct. 19, 2011", 9 pgs.

"U.S. Appl. No. 11/780,985, Final Office Action dated Nov. 19, 2015", 6 pgs.

"U.S. Appl. No. 11/780,985, Non Final Office Action dated Jun. 20, 2011", 9 pgs.

"U.S. Appl. No. 11/780,985, Non Final Office Action dated Jun. 24, 2015", 6 pgs.

"U.S. Appl. No. 11/780,985, Non-Final Office Action dated Apr. 7, 2010", 8 pgs.

"U.S. Appl. No. 11/780,985, Pre-Appeal Brief Reques filed Jan. 19, 2012", 5 pgs.

"U.S. Appl. No. 11/780,985, Response filed Feb. 23, 2011 to Non Final Officee Action dated Nov. 3, 2010", 16 pgs.

"U.S. Appl. No. 11/780,985, Response filed Mar. 21, 2016 to Final Office Action dated Nov. 19, 2015", 20 pgs.

"U.S. Appl. No. 11/780,985, Response filed May 31, 2011 to Final Office Action dated Mar. 28, 2011", 15 pgs.

"U.S. Appl. No. 11/780,985, Response filed Jul. 7, 2010 to Non Final Office Action dated Apr. 7, 2010", 11 pgs.

"U.S. Appl. No. 11/780,985, Response filed Oct. 26, 2015 to Non-Final Office Action dated Jun. 24, 2015", 21 pgs.

"U.S. Appl. No. 11/780,985, Response filed Dec. 19, 2011 to Non-Final Office Action dated Oct. 19, 2011", 14 pgs.

"U.S. Appl. No. 11/780,985, Response filed Sep. 20, 2010 to Final Office Action dated Jul. 22, 2010", 12 pgs.

"U.S. Appl. No. 11/780.985 Non-Final Office Action dated Nov. 3, 2010", 9 pgs.

Appeal Brief filed on Apr. 26, 2012, for U.S. Appl. No. 11/780,985, 27 pages.

Applicant Initiated Interview Summary received for U.S. Appl. No. 11/780,985, dated Sep. 11, 2015, 3 pages.

Non-Final Office Action received for U.S. Appl. No. 11/780,985, dated Jun. 23, 2016, 8 pages.

Reply Brief filed on Jul. 10, 2012, for U.S. Appl. No. 11/780,985, in response to Examiner's Answer to Appeal Brief dated May 10, 2012, 5 pages.

\* cited by examiner

MULTI-DIMENSIONAL QUERY STATEMENT MODIFICATION

RELATED APPLICATIONS

The present application is a continuation application that claims the benefit of U.S. application Ser. No. 11/780,985, filed Jul. 20, 2007 which is incorporated herein by reference in its entirety.

TECHNICAL FIELD

Example embodiments relate generally to the technical field of query statement modification, and in one specific example, to a system for multi-dimensional query statement modification.

BACKGROUND

The Internet technologies and their widespread use have made it possible for many people to participate in online trade activities. Many companies facilitate trade on servers connected to users over one or more networks, typically including the Internet. The users buying and/or selling items over these networks loosely comprise a marketplace community within an electronic environment. A distinction between non-electronic selling practices such as traditional stores and current electronic selling mechanisms is the component of anonymity inherent in an electronic environment, which is not always conducive to forming a trusting environment in which two or more users wish to form a business relationship.

To overcome some reservations about the anonymity component within the electronic marketplace community and to provide incentives for participating in transactions within electronic marketplaces. Internet marketplaces, such as auction sites run by eBay. Inc. of San Jose, Calif. provide feedback ratings generated from feedback between users. A user's feedback rating may indicate the user's reputation within the electronic community and provides some indication of the trustworthiness and responsiveness of that user. A representation of a user's feedback rating may be displayed along with a business transaction request by the user.

Feedback ratings may provide a useful mechanism for indicating a level of user's trustworthiness or past participation within an electronic commerce forum. Users desire to increase their feedback ratings because they are one indication of a user's reputation in the electronic community, and users with high feedback ratings may enjoy expanded opportunities to transact business and obtain higher profits or access to more goods and services. To further motivate the earning of a high feedback rating, some marketplace providers give awards or identify the users whose feedback ratings have reached a certain value, or who are among some number of users with the highest feedback ratings.

BRIEF DESCRIPTION OF THE DRAWINGS

Some embodiments are illustrated by way of example and not limitation in the figures of the accompanying drawings in which.

DETAILED DESCRIPTION

Example methods and systems for searching for objects using reputation information have been described. In the following description, for purposes of explanation, numerous specific details are set forth in order to provide a thorough understanding of example embodiments. It will be evident, however, to one skilled in the art that the present invention may be practiced without these specific details.

For the purpose of present application, the term "reputation dimension" shall be taken to include, but not be limited to, various aspects of reputation information associated with an entity participating in an activity (e.g., overall performance, cost of shipping, timeliness, communication, quality of advertisements, quality of listing descriptions, quality of packaging, quality of services provided, and the like).

Some embodiments described herein may include searching databases of objects (e.g., items, services, etc.) using some reputation dimensions and their related attributes (e.g., feedback scores, percentage ratings, overall feedback ratings such as a weighted average of feedback scores, positive and negative comments, etc.) as part of search query. The feedbacks received from trading parties may be analyzed and the result of the analysis (e.g., in the form of attributes of the reputation dimensions) may be presented to users for selection. The selected reputation dimensions and related attributes may then be included in the search criteria. This refinement of search may be conducive to enhancement of the user's confidence in certain qualifications of a third party (e.g., a potential trading party).

In some example embodiments, a method may include presenting multiple reputation dimensions and attributes, related to each of the reputation dimensions, to users. The reputation dimensions may include the reputation dimensions related to a marketplace participant (e.g., seller, buyer, service provider, or client) or participant in some other network-based activity (e.g., online gaming, social or business networking etc.). A method may also include detecting user selections of a reputation dimensions and attributes related to the reputation dimension.

The selected attributes related to reputation dimensions may then be included as a criterion part of a search query when conducting a search of a database of objects using the search query to generate search results. The criterion part of the search query may be used to filter the database of objects in order to limit the number of objects included in the search results.

In an example embodiment, a method may include sorting the search results, using a selected reputation dimension (e.g. selected by a user from a list of reputation dimensions presented to the user) and displaying sorted search results. An example method may include providing a notification message to the user when an attribute of a reputation dimension other than the reputation dimensions selected by the user transgresses a threshold (e.g., one of the feedback ratings or an overall feedback rating falls below a predefined lower limit or exceeds a predefined higher limit).

According to some example embodiments, a reputation dimension may include transaction participation aspects for which feedback is available (e.g., overall performance, cost of shipping, timeliness, communication, quality of advertisements, quality of listing descriptions, quality of packaging, quality of services provided, and the like). A selected attribute related to a reputation dimension may include feedback ratings and comments corresponding to the reputation dimension (e.g., feedback scores, percentage ratings, overall feedback rating, positive and negative comments, etc.).

In one example embodiment, a method may include receiving detailed feedback ratings by requesting a feedback giver to respond to specific questions relating to certain transaction participation aspects (e.g., what aspect of the shipping and handling the feedback giver was least satisfied with, or what specific qualification of a seller the feedback giver appreciates the most, etc.). This kind of granular feedback may be useful for a user to obtain a better understanding of the qualifications of a respective trading party.

Figure 1:
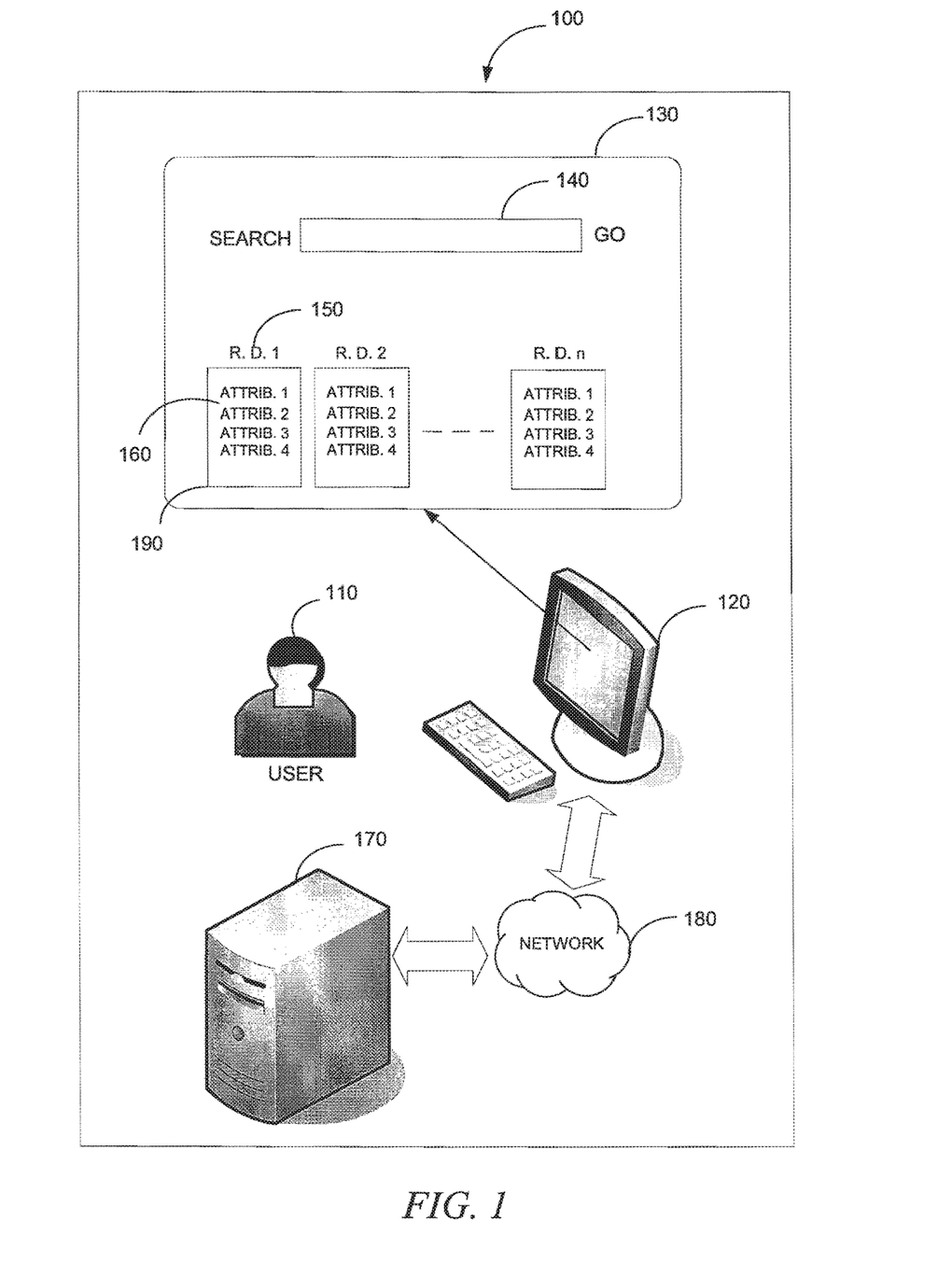
FIG. 1 is a high level diagram depicting an example embodiment of a system for conducting multifaceted search for objects using reputation information.

FIG. 1 is a high level diagram depicting an example embodiment of a system 100 for conducting multifaceted search for objects using reputation information. The system 100 may include a user 110, a user computer 120, a server 170, a network 180 and a user interface 130. The user computer 120 is linked to the server 170 via the network 180 (e.g., the Internet). The server 170 may include a database of objects that the user 110 may be interested in searching.

The user 110 may use the user computer 120 to go online and provide input to a page provided by the server 170 to search for an object. The example user interface 130 may be provided by the server 170 to the user 110 to search for an object using reputation information. The user interface 130 depicts a search-box 140, multiple reputation dimensions 150, and list-boxes 190, which may list attributes 160 related to each of the reputation dimensions 150.

The user 110 may select any of the reputation dimensions 150 to be used in the search for the object. In addition, in the list-boxes 190, under each selected reputation dimension(s) 150, the user 110 may select any attributes 160 related to the selected reputation dimensions 150 that the user may want to be used for the search of the object. The server 170 may use the selected reputation dimensions and the selected attributes related to the selected reputation dimensions as a criterion part of a query used to search for the object.

In an example embodiment, the object may be an item (e.g., a data item or a described physical item) or a service. The object may also be listed in an online marketplace, for example. The reputation dimension 150, for example, may include overall performance, cost of shipping, timeliness, communication, quality of advertisement, quality of a listing description, quality of packaging, quality of service provided and the like. Reputation dimension attributes 160 may include feedback scores, percentage ratings, overall feedback ratings such as a weighted average of feedback scores, positive and negative comments, etc.

Figure 2:
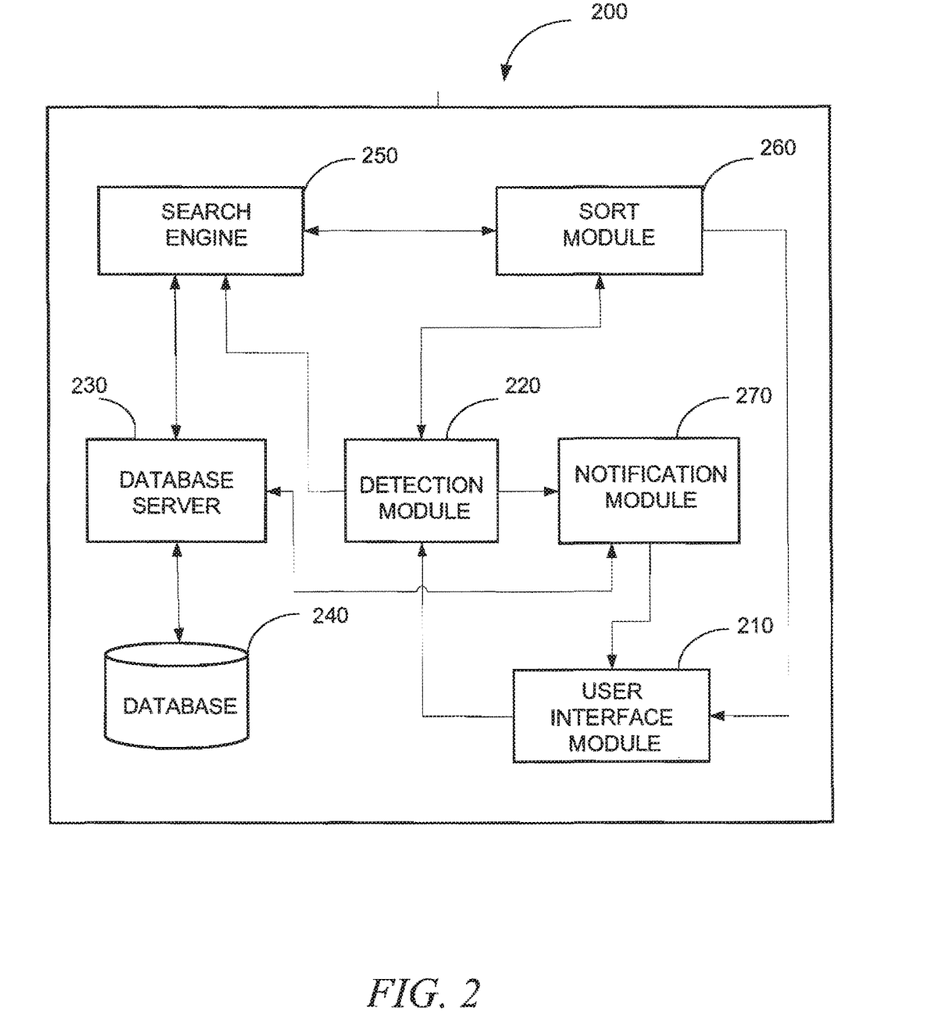
FIG. 2 is a block diagram illustrating an example embodiment of a multifaceted search system using reputation information.

FIG. 2 is a block diagram illustrating an example embodiment of a multifaceted search system 200 using reputation information. The search system 200 may include a user interface module 210, a detection module 220, a database server 230, a database 240, a search engine 250, a sort module 260 and a notification module 270.

The user interface module 210 may present to the user 110 the user interface 130, on which the user 110 may search for an object using reputation dimension 150 and related attributes 160 to be used as part of a search criterion in searching for the object. The user 110 may also select any of the reputation dimensions 150 presented in the user interface 130 to be applied in the search criteria used to search for the object. The user 110 also has the option of selecting any attribute 160 related to the selected reputation dimension (s) 150 to be included in the search criteria for the search.

The detection module 220 may detect the selected reputation dimensions 150 and the selected related attributes 160 by the user 110. The search engine 250 may use the selected reputation dimension(s) 150 and the attributes 160 detected by the detection module 220, as part of the search query used to search the database 240 of objects via the database server 230.

In an example embodiment, the search engine 250 may use other search criteria not shown in the user interface 130. According to some example embodiments, the user 110 may require to have the search result sorted, based on the selected reputation dimensions 150 and the attributes 160 selected by the user 110. The sort module 260 may sort the search results using the selected reputation dimension(s) 150 (e.g., selected by the user 110 from a list of reputation dimension 150 presented to the user.) The sort module 260 may send the sorted results to the user interface module 210 for display to the user 110.

In an example embodiment, the notification module 270 may provide a notification message to the user 110, in case where an attribute 160 of a reputation dimension other than the reputation dimensions 150 selected by the user transgresses a threshold (e.g., one of the feedback ratings or an overall feedback rating falls below a predefined lower limit or exceeds a pre-defined higher limit). The notification message provided by the notification module 270 may be passed to the user interface module 210 to be displayed in an appropriate location in the user interface 130 presented to the user 110.

Figure 3:
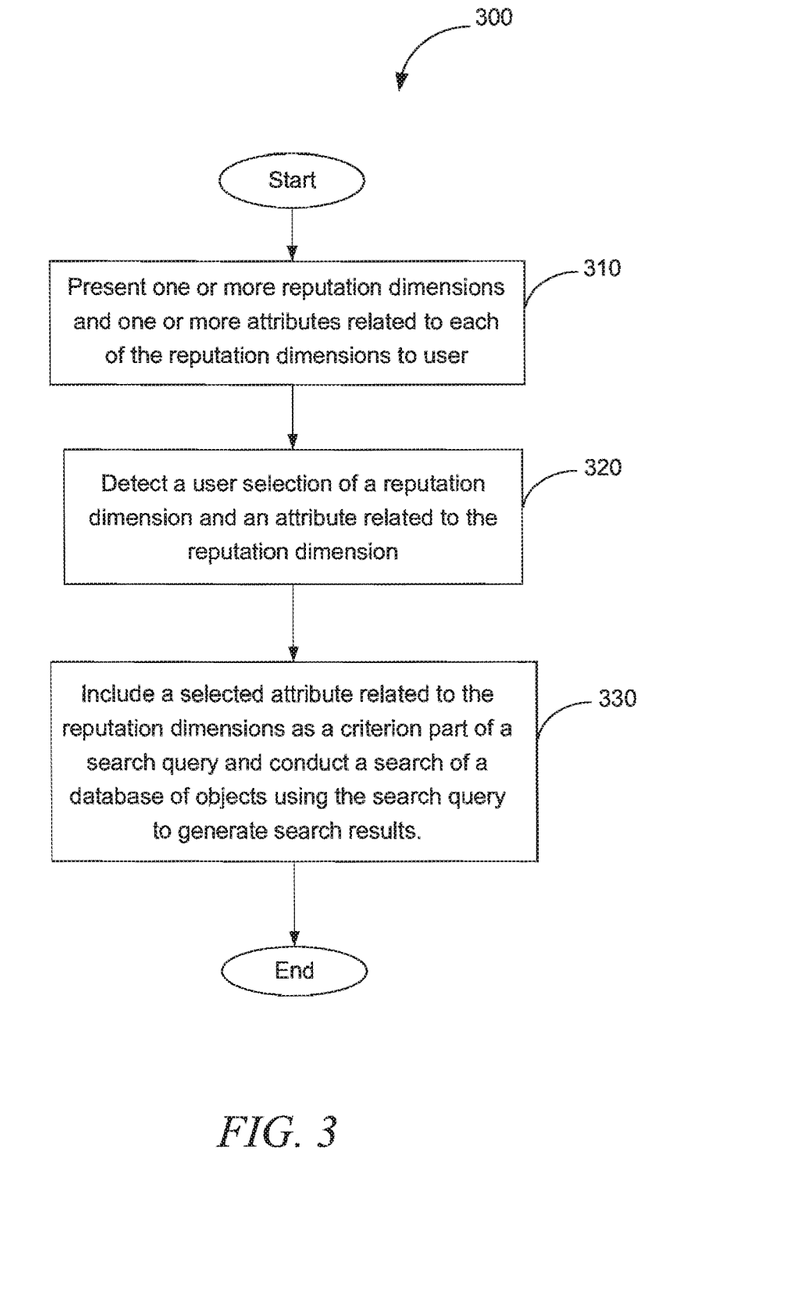
FIG. 3 is a flow diagram illustrating an example embodiment of a method of searching for objects using reputation information.

FIG. 3 is a flow diagram illustrating an example embodiment of a method 300 of searching for objects using reputation information. The method 300 starts at operation 310, where the user interface module 210 presents to the user 110, via a user interface 130, one or more reputation dimensions 150 and one or more attributes 160 related to each of the reputation dimensions 150. The user 110 then may select any of the reputation dimensions 150, as well as the attributes 160 related to the selected reputation dimension(s) 150, to be used in the search query when searching for the object.

At operation 320, the detection module 220 may detect the user 110 selection of the reputation dimensions 150 and attributes 160 related to the selected reputation dimension(s) 150. In an example embodiment, at operation 330, the search engine 250 may include the selected reputation dimension(s) 150 and selected attribute(s) 160, related to the selected reputation dimension(s) 150, as a criterion part of a search query and conduct a search of a database 240 of objects, using the database server 230, to generate search results.

Figure 4:
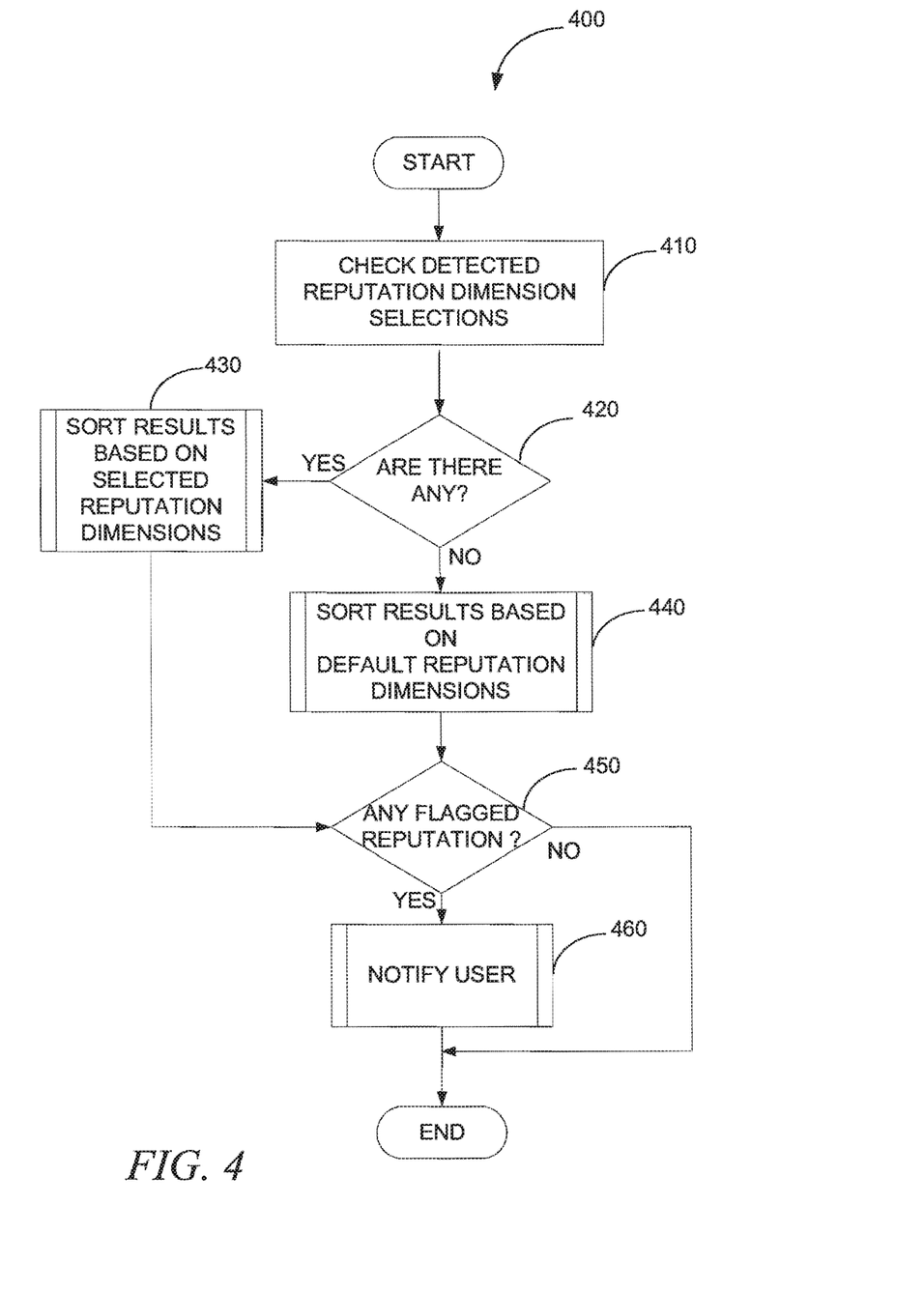
FIG. 4 is a flow diagram depicting an example embodiment of a method for sorting the search results of the method of FIG. 4.

FIG. 4 is a flow diagram depicting an example embodiment of a method 400 for sorting the search results of the method of FIG. 4. The method 400 starts at operation 410 where the sort module 260 checks the detected reputation dimension 150, selected by the user 110 and detected by the detection module 220, to determine if any of the reputation dimensions 150 have been selected by the user.

In control operation 420, it is determined whether the user 110 has selected at least one of the reputation dimensions 150 to be included in the search query of the object. At operation 430, the sort module 260 may sort the search results produced by the search engine 250 according to the selected reputation dimension(s) 150 as shown in more detail in FIG. 7.

In an example embodiment, in a case where the user 110 did not select any of the reputation dimensions presented via the user interface 130, then the sort module 260 may sort the results produced by the search engine 250, based on some default reputation dimensions not selected by the user 110, or even not presented to the user 110 via user interface 130.

At control operation 450, the notification module 270, may determine that one or more reputation dimensions, associated with a party other than the reputation dimension(s) 150 selected by the user 110, have transgressed a threshold (e.g., one of the feedback ratings or an overall feedback rating has fallen below a predefined lower limit, or has exceeded a predefined higher limit). This determination may be based on the information received from the detection module 220 and the existing information stored on the database 240. In that case, at operation 460, the notification module 270 may provide a notification message via the user interface module 210 to the user 110.

In an example embodiment, the user interface module 210 may accordingly include the notification message in the user interface 130 in order to notify user 110. The notification message may be displayed as a footnote or adjacent to the name of the party.

Figure 5:
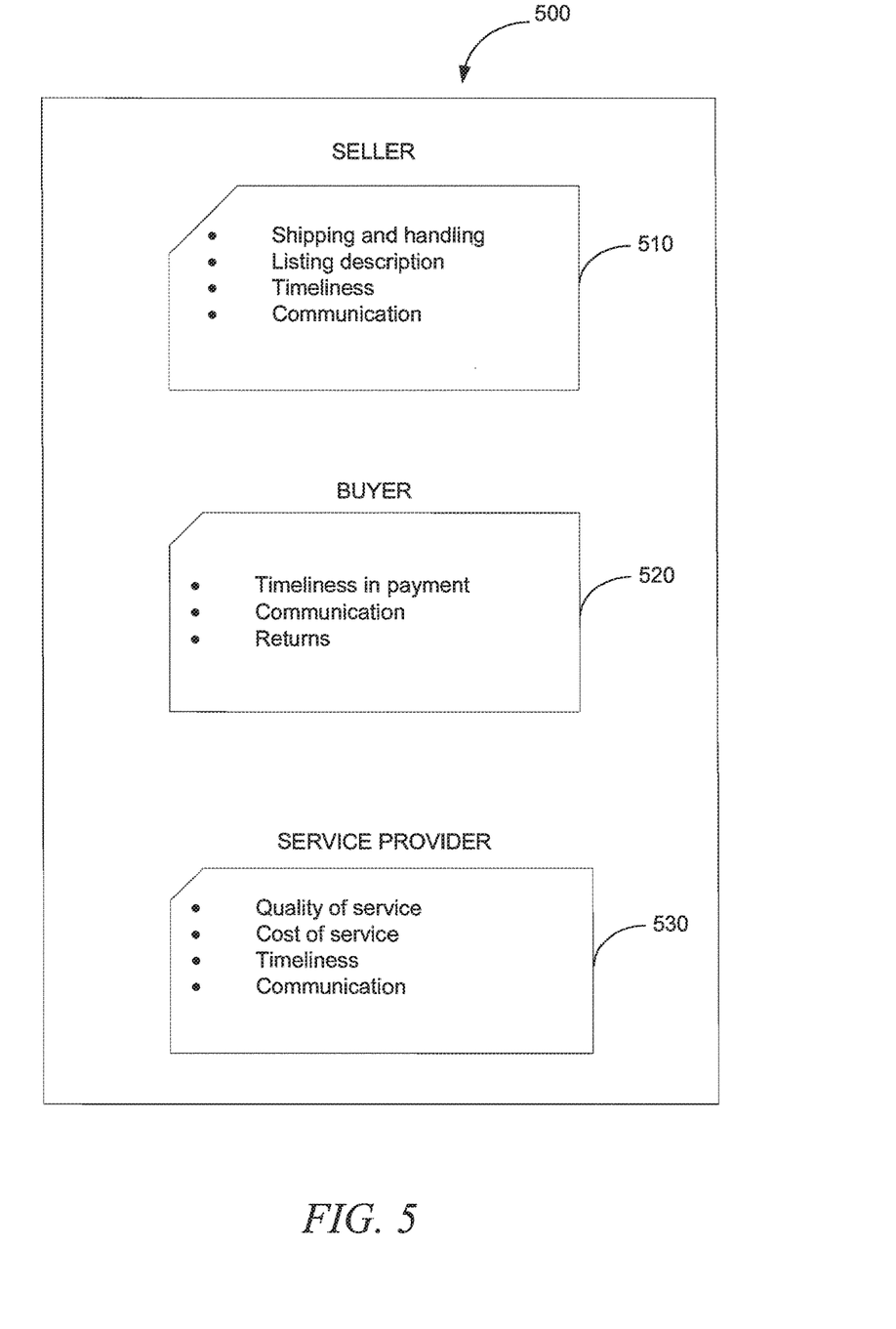
FIG. 5 is a diagram illustrating in an example embodiment of sets of reputation dimensions associated with sellers, buyers, and service providers.

FIG. 5 is a diagram illustrating an example embodiment of sets 500 of reputation dimensions 150 associated with sellers, buyers, and service providers. The reputation information stored in a database 240 may include feedback information related to sellers, buyers, or service providers.

In some embodiments, the feedback information pertaining to sellers may relate to one or more of the reputation dimensions 150 listed in box 510, including shipping and handling, listing description, timeliness, and communication. The shipping and handling reputation dimension, for example, may indicate that the seller had negative feedback relating to some shipping and handling aspects such as shipment timing, or quality of packaging. The listing description aspect may correspond, for example, to a vague description of a listed item or a description lacking some key features of the listed items, etc.

An example list 520 presents some example reputation dimensions pertaining to buyers that may have received feedback from the sellers of the items. These reputation dimensions may be related to timeliness in payment, communications, and returns. Concerning the returns, the seller might have provided comments regarding the quality of the packaging of a returned item or the status of the returned item received from a buyer, compared to the status of the item as it was delivered to the buyer.

In cases where some listed services are provided by some service providers, a client may provide feedback related to the reputation dimensions listed in box 530 including quality of the service provided, cost of the service that was provided to the client, timeliness of the provision of the services, and the communication of the service provider with the client. In some example embodiments, the client may be unsatisfied or very satisfied with one or more aspects of a service received. The client may also find some portions of the cost of service charged by the service provider, excessive or irrelevant. The client may include these observations in a feedback left for the service provider.

Figure 6:
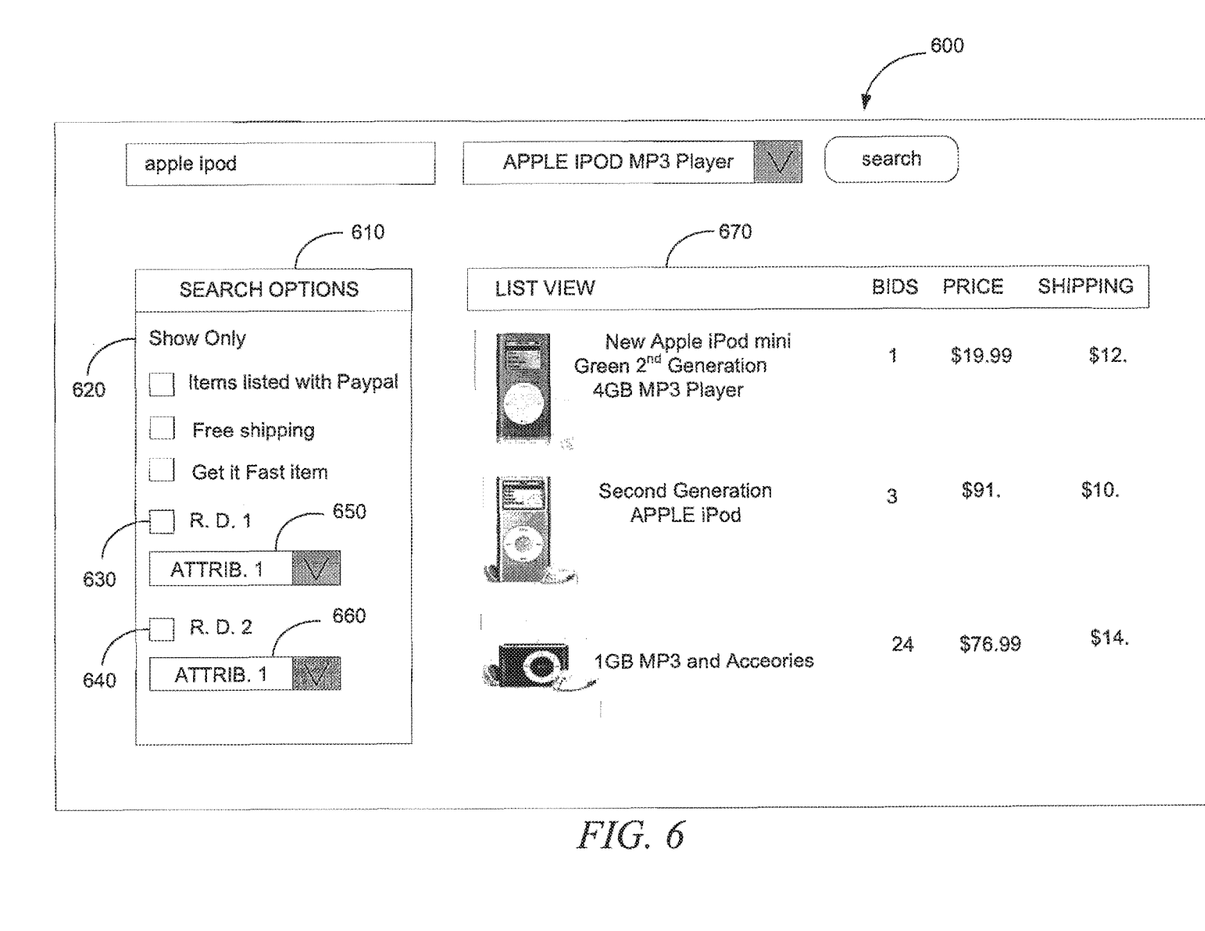
FIG. 6 is a screen shot illustrating an example embodiment of a user interface including reputation dimensions in search options.

FIG. 6 is a screenshot illustrating an example embodiment of a user interface 600 including reputation dimensions added to the search options. The user interface 600 may represent an example user interface presented to the user 110 by the user interface module 210. In the example user interface 600, the user 110 is searching for an Apple iPod MP3 player. The user interface 600 may include a search option box 610 and a list view portion 670.

The user 110 may select from the options provided in the search option box 610 to limit his or her search to specific items. The search engine 250 may use the selected options to find objects of interest to the user 110. The user interface module 210 then may present the results under the list view 670 of the user interface 600. In the example embodiment shown in FIG. 6, the list view 670 includes number of bids, price, and shipping cost.

The example search option box 610 may include a "show only" portion 620. Only search objects satisfying the conditions listed in the show only portion 620 may be listed under the list view 670. The show only portion 620 of the search option box 610 in the example user interface 600, includes a first reputation dimension 630 (R.D. 1) and a second reputation dimension 640 (R.D. 2)

Under the first reputation dimension 630 (e.g., shipping and handling), a list box 650 may be included to show the selections of attributes (e.g., feedback ratings such as 3, 4, 5, >3, etc.) related to the first reputation dimension 630. The user 110 may select, from the list box 650, the desired attributes of the first reputation dimension 630 that he or she may desire to be included in the search of the object. A list-box 660, shown under the second reputation dimension 640 (e.g., negative feedback ratings), may provide the user 110 with a list of attributes (e.g., <20%, <10%, <5%, etc.) related to the second reputation dimension 640 that the user may select from. The selection of first and second reputation dimensions 630 and 640 may affect the search results generated by the search engine 250 as shown in FIG. 7.

Figure 7:
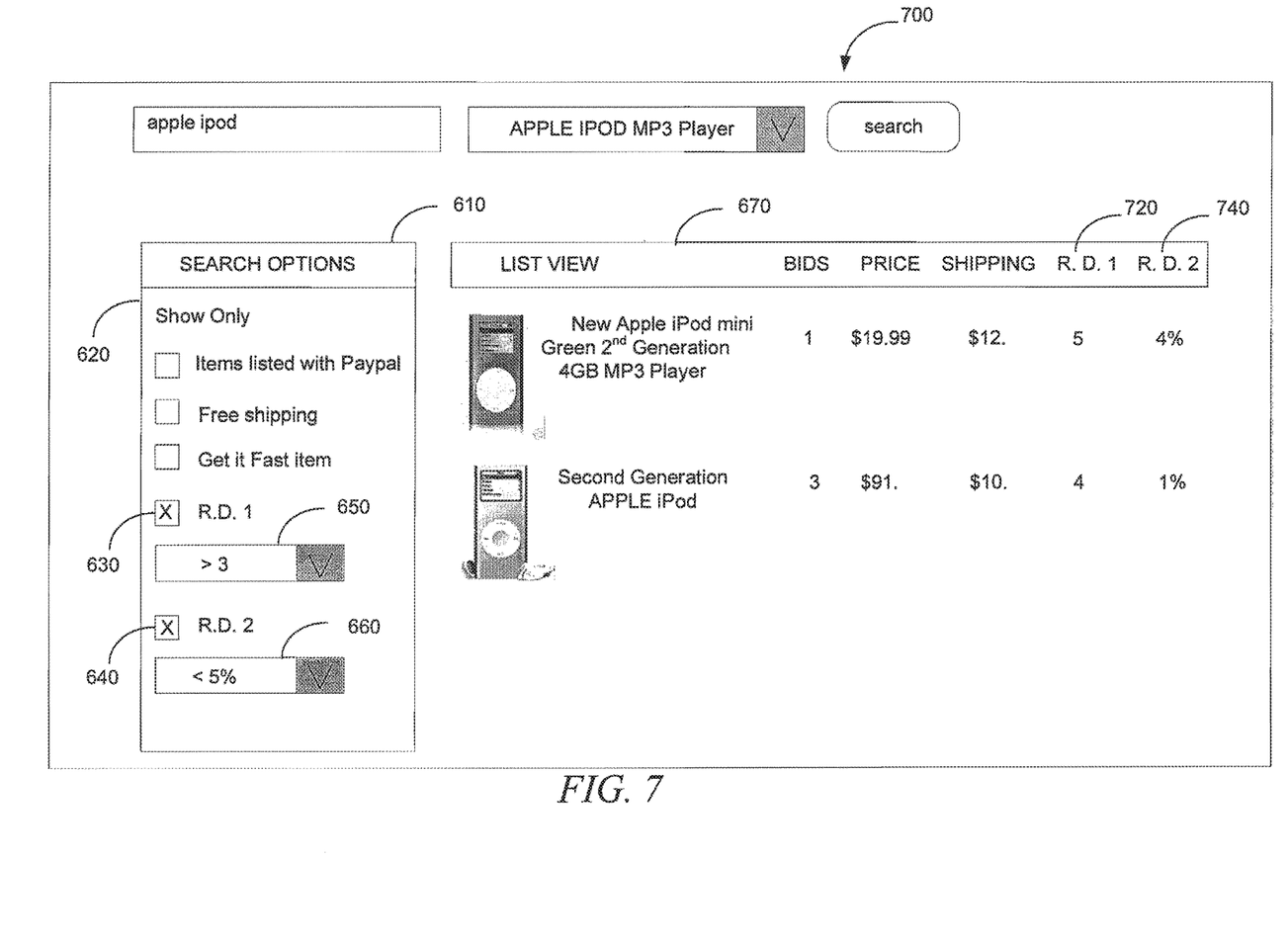
FIG. 7 is a screen shot illustrating an example embodiment of a user interface including reputation dimensions in the search options and displaying search results sorted based on selected reputation dimensions.

FIG. 7 is a screenshot illustrating an example embodiment of a user interface 700, including reputation dimensions in the search options and displaying search results sorted based on selected reputation dimensions. According to the example user interface 700, the user 110 has selected both the first and the second reputation dimensions 630 and 640 to be included as the search criteria for an Apple iPod.

The selections of the first reputation dimension 630 and the second reputation dimension 640 are reflected in the search results by including R.D. 1 and R.D. 2 as columns 720 and 740 of the list view 670. According to the example user interface 700, the user 110 has selected the shown attribute of greater than 3 (>3) from the list-box 650 as a selected attribute of the selected first reputation dimension 630. Also, by selecting the second reputation dimension 640 and the attribute value of less than 5 percent from the list-box 660, the user 110 may have requested that only the Apple iPods having the qualifications corresponding to the selections be shown in the search result.

Accordingly, only two of the Apple iPods presented in FIG. 6 have been selected to be included in the listed view of the user interface 700. For both of the included Apple iPods, the value of the first reputation dimension 630 in column 720 is higher than 3 (e.g., 4 and 5); and both of these iPods are showing values of the second reputation dimension 640 (column 740) less than 5% (e.g., 4% and 1%). In some example embodiments, the first and the second reputation dimensions 630 and 640 may include any of the reputation dimensions listed in FIG. 5 (e.g., shipping and handling, listing description, timeliness, communications, etc.).

Figure 8:
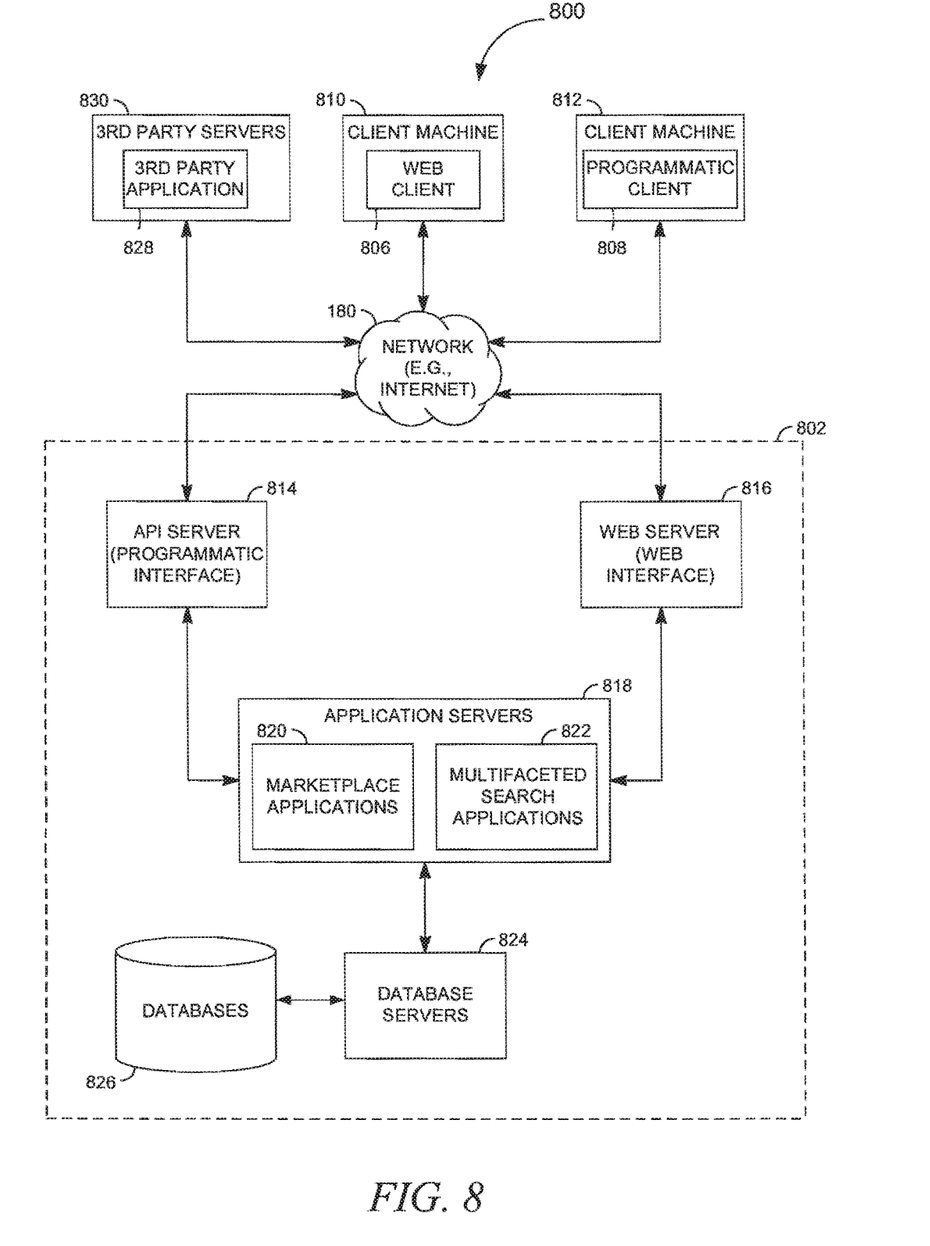
FIG. 8 is high level block diagram illustrating an example embodiment of a network-based commerce system, having a client-server architecture, using reputation information for multifaceted search for objects.

FIG. 8 is a high-level block diagram illustrating an example embodiment of a network-based publication system 800, having a client-server architecture for performing search using multifaceted reputation information. A publication platform, in the example form of a network-based marketplace 802, provides server-side functionality, via a network 180 (e.g., the Internet) to one or more clients. FIG. 8 illustrates, for example, a web client 806 (e.g., a browser, such as the INTERNET EXPLORER browser developed by MICROSOFT CORPORATION of Redmond, Wash.), and a programmatic client 808 executing on respective client machines 810 and 812.

Turning specifically to the network-based marketplace 802, an Application Program Interface (API) server 814 and a web server 816 are coupled to, and provide programmatic and web interfaces respectively to, one or more application servers 818. The application servers 818 host one or more marketplace applications 820 and multifaceted search applications 822. The application servers 818 are, in turn, shown to be coupled to one or more database servers 824 that facilitate access to one or more databases 826.

The marketplace applications 820 provide a number of marketplace functions and services to users that access the marketplace 802. The multifaceted search applications 822 facilitates online search for objects using reputation dimensions as part of the search query.

Further, while the system 800 shown in FIG. 8 employs a client-server architecture, the present application is of course not limited to such an architecture, and could equally well find application in a distributed, or peer-to-peer, architecture system. The various marketplace and multifaceted search applications 820 and 822 may also be implemented as standalone software programs, which do not necessarily have networking capabilities.

The web client 806, it will be appreciated, may access the various marketplace and multifaceted search applications 820 and 822 via the web interface supported by the web server 816. Similarly, the programmatic client 808 accesses the various services and functions provided by the marketplace and multifaceted search applications 820 and 822 via the programmatic interface provided by the API server 814. The programmatic client 808 may, for example, be a seller application (e.g., the TurboLister application developed by EBAY INC., of San Jose, Calif.) to enable sellers to author and manage listings on the marketplace 802 in an off-line manner, and to perform batch-mode communications between the programmatic client 808 and the network-based marketplace 802.

FIG. 8 also illustrates a third party application 828, executing on a third party server machine 830, as having programmatic access to the network-based marketplace 802 via the programmatic interface provided by the API server 814. For example, the third party application 828 may, utilizing information retrieved from the network-based marketplace 802, support one or more features or functions on a website hosted by the third party. The third party website may, for example, provide one or more promotional, marketplace or payment functions that are supported by the relevant applications of the network-based marketplace 802.

Figure 9:
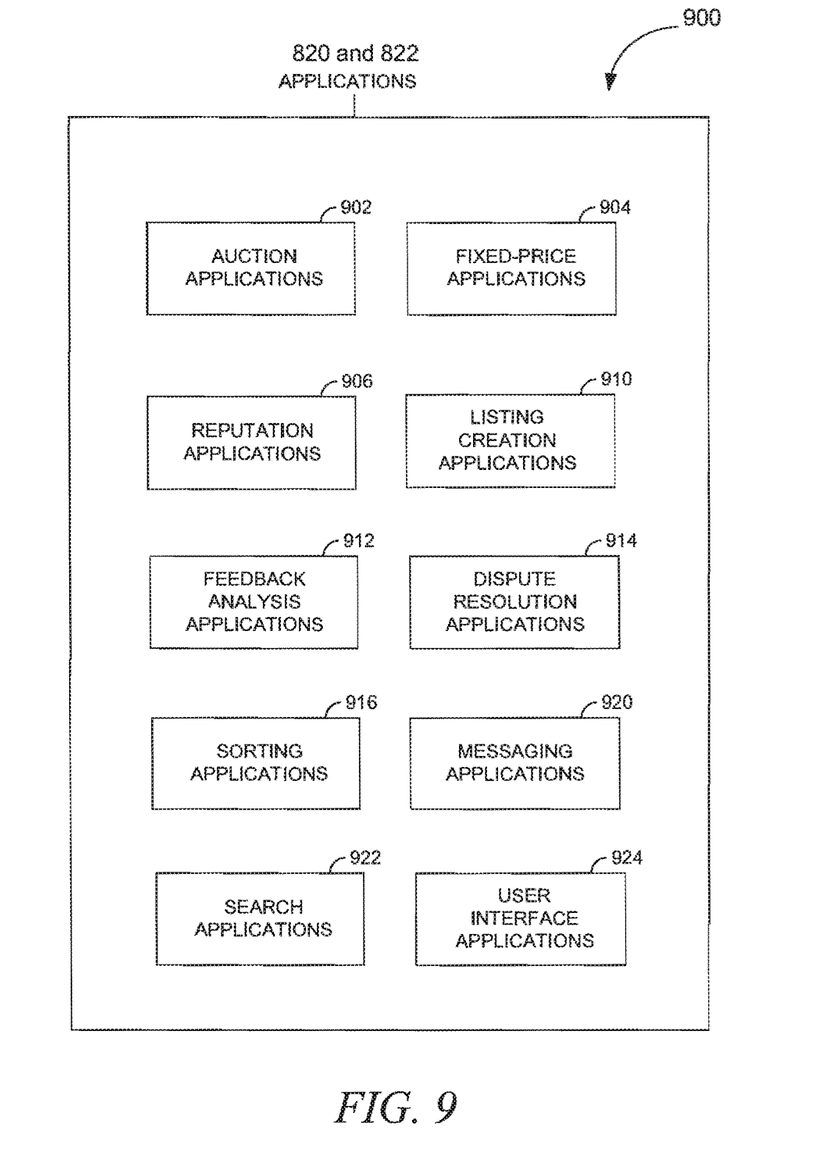
FIG. 9 is an example set of marketplace and multifaceted search applications used by the network-based commerce system of FIG. 8.

FIG. 9 is a diagram illustrating multiple example marketplace and multifaceted search applications 900 that, in one example embodiment, are provided as part of the network-based marketplace 802. The marketplace 802 may provide a number of listing and price-setting mechanisms whereby a seller may list goods or services for sale, a buyer may express interest in or indicate a desire to purchase such goods or services, and a price may be set for a transaction pertaining to the goods or services.

The marketplace applications 820 are shown to include one or more auction applications 902 which support auction-format listing and price setting mechanisms (e.g., English, Dutch, Vickrey, Chinese, Double, Reverse auctions etc.). The various auction applications 902 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 904 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with an auction-format listing, and allow a buyer to purchase goods or services, which are also being offered for sale via an auction, for a fixed-price that is typically higher than the starting price of the auction.

Reputation applications 906 may allow parties that transact utilizing the network-based marketplace 802 to establish, build, and maintain reputations related to market participants (e.g., sellers, buyers, service providers, or clients) which may be published and made available to potential trading partners. Consider that where, for example, the network-based marketplace 802 supports person-to-person trading, users may have no history or other reference information whereby the trustworthiness and credibility of potential trading partners may be assessed. The reputation applications 906 may allow a user, for example through feedback provided by other transaction partners, to establish a reputation within the network-based marketplace 802 over time. Other potential trading partners may then reference such a reputation for the purposes of assessing credibility and trustworthiness.

Listing creation applications 910 may allow sellers or service providers to conveniently author listings pertaining to goods or services that they wish to sell via the marketplace 802.

Dispute resolution applications 914 may provide mechanisms whereby disputes arising between transacting parties may be resolved. For example, the dispute resolution applications 914 may provide guided procedures whereby the parties are guided through a number of steps in an attempt to settle a dispute. In the event that the dispute cannot be settled via the guided procedures, the dispute may be escalated to a third party mediator or arbitrator.

Feedback analysis applications 912 may allow the network-based marketplace 802 to analyze feedback information received by the reputation applications 906 and make assessments with respect to performances of the trading parties. The feedback analysis applications 912 may provide attributes (e.g., rankings, percentages, comments, etc.)

related to reputation dimensions (e.g., overall feedback rating, feedback ratings on cost of shipping, timeliness, communication, quality of advertisements, quality of listing descriptions, quality of packaging, quality of services provided, and the like). These attributes may be used by sorting applications 916 to sort search results generated by search applications 922.

As part of the multifaceted search applications 822, search applications 922 may facilitate searching objects using reputation dimensions from reputation applications 906 and attributes related to the reputation dimensions provided by the feedback analysis applications 912, as part of their search query. The search results may be provided to sorting applications 916 for sorting.

The sorting applications 916 may obtain the search results provided by the search applications 922 and sort the results based on the selected attributes related to reputation dimensions of interest to the user. For example a user may desire to sort found objects based on feedback ratings on timeliness of sellers of found objects. For example, the user may select that only objects offered by sellers who have timeliness rating score higher than 6 be displayed. The sorting applications 916, then may sort the search results according to the seller's timeliness ranting score and only list those objects for which the sellers have timeliness scores better than 6. The sorting applications 916 may then send the listed objects to user interface applications 924 to be displayed to the user.

Messaging applications 920 are responsible for the generation and delivery of messages to users of the network-based marketplace 802. Such messages may, for example, advise users regarding the status of listings at the network-based marketplace 802 (e.g., providing "outbid" notices to bidders during an auction process or providing promotional and merchandising information to users). In one example embodiment, the messaging applications 920 may notify a user, when an entity (e.g., seller, buyer, service provider, or client) associated with a searched object has transgressed a predefined threshold related to an attribute of a reputation dimension other than the ones selected by the user as a search query (e.g., the user has selected the shipping cost as the search criteria but among the found objects, there are ones offered by sellers who have more than 35% late delivery of sold items. In this case, the messaging applications may notify the user of such instances if the predefined threshold is 20%)

Example Machine Architecture

Figure 10:
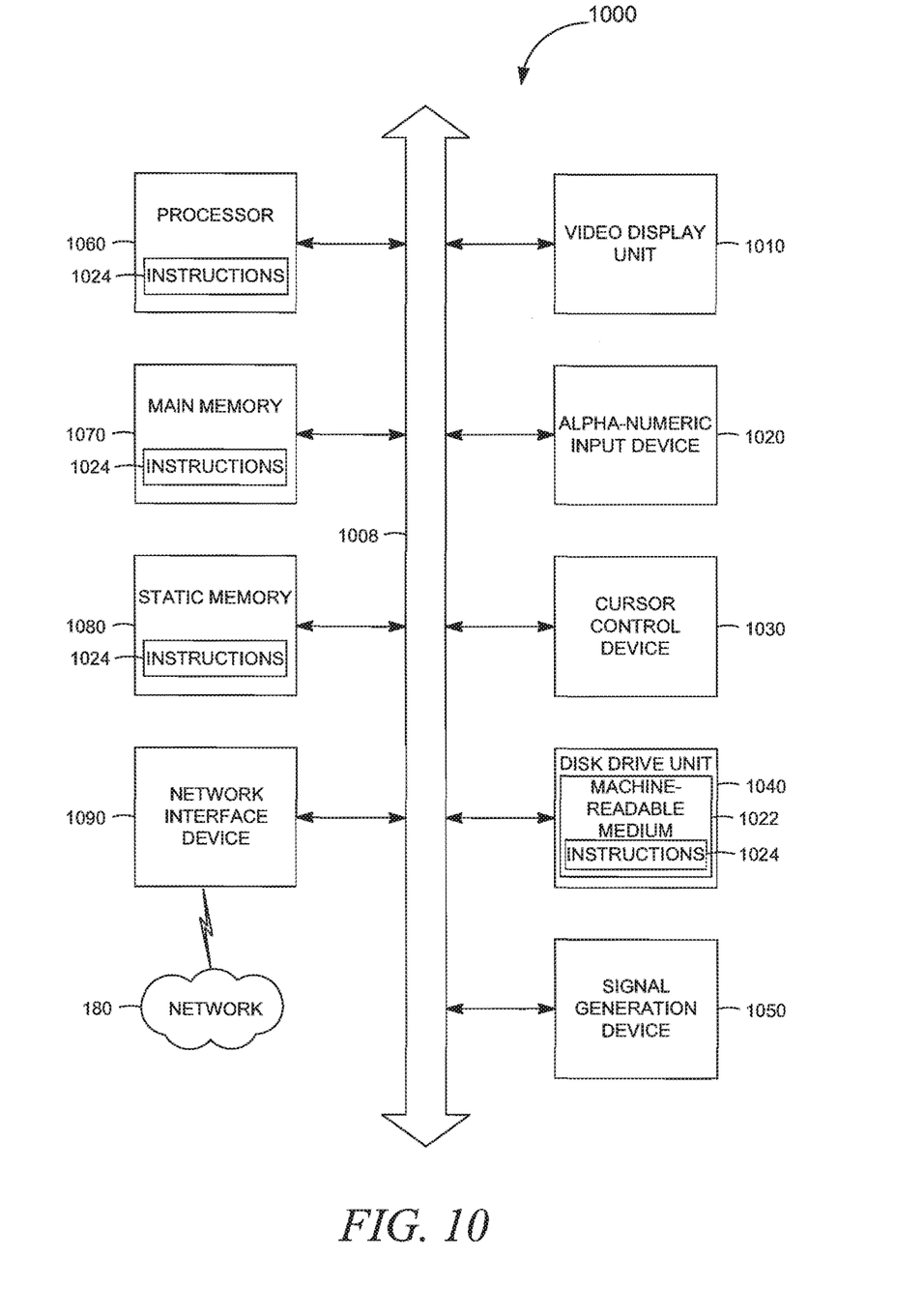
FIG. 10 is a block diagram illustrating a diagrammatic representation of a machine in the example form of a computer system.

FIG. 10 is a block diagram, illustrating a diagrammatic representation of machine 1000 in the example form of a computer system within which a set of instructions for causing the machine to perform any one or more of the methodologies discussed herein may be executed. In alternative embodiments, the machine 1000 may operate as a standalone device or may be connected (e.g., networked) to other machines. In a networked deployment, the machine 1000 may operate in the capacity of a server or a client machine in a server-client network environment, or as a peer machine in a peer-to-peer (or distributed) network environment. The machine 1000 may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 may include a processor 1060 (e.g., a central processing unit (CPU), a graphics processing unit (GPU) or both), a main memory 1070 and a static memory 1080, all of which communicate with each other via a bus 1008. The computer system 1000 may further include a video display unit 1010 (e.g., liquid crystal displays (LCD) or cathode ray tube (CRT)). The computer system 1000 also may include an alphanumeric input device 1020 (e.g., a keyboard), a cursor control device 1030 (e.g., a mouse), a disk drive unit 1040, a signal generation device 1050 (e.g., a speaker) and a network interface device 1090.

The disk drive unit 1040 may include a machine-readable medium 1022 on which is stored one or more sets of instructions (e.g., software 1024) embodying any one or more of the methodologies or functions described herein. The software 1024 may also reside, completely or at least partially, within the main memory 1070 and/or within the processor 1060 during execution thereof by the computer system 1000, the main memory 1070 and the processor 1060 also constituting machine-readable media.

The software 1024 may further be transmitted or received over a network 280 via the network interface device 1090.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories and optical and magnetic media.

Thus, a method and a system for searching for objects using reputation dimensions and their attributes as part of search query have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
at least one processor; and
a computer-readable medium storing executable instructions that, when executed by the at least one processor, cause the at least one processor to perform operations comprising:
presenting a user interface including a first plurality of graphical elements representing a plurality of activity dimensions to a user, the plurality of activity dimensions including a first activity dimension and second activity dimension, the first activity dimension including a second plurality of graphical elements representing a first plurality of attributes including a first attribute and the second activity dimension including a third plurality of graphical elements representing a second plurality of attributes including a second attribute;
detecting a first user selection of the first activity dimension and a second user selection of the first attribute without detecting a selection of the second attribute;
searching a database of objects using a search query to generate search results, the search query including the first activity dimension and the first attribute, the search results including a first object that is published on a network-based publication system by a client; and
providing a notification message to the user responsive to identifying feedback information that is received from a trading partner of the client as transgressing a first threshold, the feedback information being identified based on the first object and the second attribute that is not selected from the user interface, the identifying being responsive to the detecting the user selection of the selected activity dimension.

2. The system of claim 1, wherein the operations further comprise:
sorting the search results based on the first activity dimension; and
displaying the sorted search results.

3. The system of claim 1, wherein the first attribute includes a feedback rating corresponding to the first activity dimension.

4. The system of claim 1, wherein the operations further comprise receiving a feedback rating responsive to communicating to a question relating to a transaction.

5. The system of claim 1, wherein the first plurality of activity dimensions includes a plurality of activity dimensions.

6. The system of claim 1, wherein the first plurality of attributes is utilized to access feedback ratings that correspond to the first plurality of attributes.

7. The system of claim 1, wherein the operations further comprise:
presenting a second user interface including a first panel and a second panel, the first panel including a presentation of the criterion part of the search query and the second panel including a presentation of the search results as a first plurality of rows.

8. The system of claim 7, wherein the second panel further includes a presentation of one or more columns intersecting the first plurality of rows.

9. The system of claim 8, wherein the first plurality of rows are respectively populated with data that is compared with the search criteria that is selected from the first panel.

10. A method comprising:
presenting a user interface including a first plurality of graphical elements representing a plurality of activity dimensions to a user, the plurality of activity dimensions including a first activity dimension and second activity dimension, the first activity dimension including a second plurality of graphical elements representing a first plurality of attributes including a first attribute and the second activity dimension including a third plurality of graphical elements representing a second plurality of attributes including a second attribute;
detecting a first user selection of the first activity dimension and a second user selection of the first attribute without detecting a selection of the second attribute, the detecting done at least in part through the use of one or more processors;
searching a database of objects using a search query to generate search results, the search query including the first activity dimension and the first attribute, the search results including a first object that is published on a network-based publication system by a client, the searching done at least in part through the use of the one or more processors; and
providing a notification message to the user responsive to identifying feedback information that is received from a trading partner of the client as transgressing a first threshold, the feedback information being identified based on the first object that is included in the search results and the second attribute that is not selected from the user interface, the identifying being responsive to the detecting the user selection of the selected activity dimension.

11. The method of claim 10, further comprising:
sorting the search results based on the first activity dimension; and
displaying the sorted search results.

12. The method of claim 10, wherein the first attribute includes feedback ratings and comments corresponding to the first activity dimension.

13. The method of claim 10, further comprising receiving a feedback rating responsive to communicating a question relating to a transaction.

14. The method of claim 10, wherein the first plurality of activity dimensions includes a plurality of activity dimensions.

15. The method of claim 10, wherein the first plurality of attributes is utilized to access feedback ratings that correspond to the first plurality of attributes.

16. The method of claim 10, further comprising:
presenting a second user interface including a first panel and a second panel, the first panel including a presentation of a criterion part of the search query and the second panel including a presentation of the search results as a first plurality of rows.

17. The method of claim 16, wherein the second panel further includes a presentation of one or more columns intersecting the first plurality of rows.

18. The method of claim 17, wherein the first plurality of rows is respectively populated with data that is compared with the search criteria that is selected from the first panel.

19. A machine-readable medium having no transitory signals and comprising instructions that, when executed by one or more processors, cause the one or more processors to perform operations comprising:
presenting a user interface including a first plurality of graphical elements representing a plurality of activity dimensions to a user, the plurality of activity dimensions including a first activity dimension and second activity dimension, the first activity dimension including a second plurality of graphical elements representing a first plurality of attributes including a first attribute and the second activity dimension including a first plurality of graphical elements representing a second plurality of attributes including a second attribute;

detecting a first user selection of the first activity dimension and a second user selection of the first attribute without detecting a selection of the second attribute;

searching a database of objects using a search query to generate search results, the search query including the first activity dimension and the first attribute, the search results including a first object that is published on a network-based publication system by a client; and providing a notification message to the user responsive to identifying feedback information that is received from a trading partner of the client as transgressing a first threshold, the feedback information being identified based on the first object that is included in the search results and the second attribute that is not selected from the user interface, the identifying being responsive to the detecting the user selection of the selected activity dimension.

20. The machine-readable medium of claim 19, wherein the operations further comprise:

presenting a second user interface including a first panel and a second panel, the first panel including a presentation of a criterion part of the search query and the second panel including a presentation of the search results as a first plurality of rows.

* * * * *